(12) United States Patent
Ort et al.

(10) Patent No.: US 7,342,594 B1
(45) Date of Patent: Mar. 11, 2008

(54) TECHNIQUES FOR DISPLAYING NON-BLOCKING ALWAYS VISIBLE DISPLAYS AND THEIR APPLICATIONS

(75) Inventors: Jeffrey G. Ort, Redmond, WA (US); Eric Engstrom, Kirkland, WA (US)

(73) Assignee: Hall Aluminum LLC, Los Altos, CA (US)

( * ) Notice: Subject to any disclaimer, the term of this patent is extended or adjusted under 35 U.S.C. 154(b) by 1379 days.

(21) Appl. No.: 09/718,868

(22) Filed: Nov. 20, 2000

(51) Int. Cl.
*G09G 5/00* (2006.01)

(52) U.S. Cl. ............... 345/629; 345/589; 345/530; 345/609; 345/581

(58) Field of Classification Search ............ 345/629
See application file for complete search history.

(56) References Cited

U.S. PATENT DOCUMENTS

| | | | | |
|---|---|---|---|---|
| 5,831,615 A | * | 11/1998 | Drews et al. | 345/768 |
| 5,999,191 A | * | 12/1999 | Frank et al. | 345/634 |
| 6,002,397 A | * | 12/1999 | Jaaskelainen, Jr. | 345/805 |
| 6,072,489 A | * | 6/2000 | Gough et al. | 345/803 |

OTHER PUBLICATIONS

All Windows Transparent, Delphion Intellectual Property Network, http://www.delphion.com/tdbs/tdb? &order=94A+61905, Jun. 1994 (1 page).
Transparent Window Selection, Delphion Intellectual Property Network, http://www.delphion.com/tdbs/tdb?&order=88A+60645, Apr. 1988 (3 pages).

* cited by examiner

*Primary Examiner*—Jin-Cheng Wang
(74) *Attorney, Agent, or Firm*—Schwabe, Williamson & Wyatt, P.C.

(57) ABSTRACT

A non-blocking always visible display application is provided to copy and save first pixel values corresponding to a first display screen area, blend the copied first pixel values with second pixel values corresponding to a non-blocking always visible display to generate third pixel values, and replace the original first pixel values with the third pixel values to effectuate display of the non-blocking always visible display. In one embodiment, the application further monitors for display operations that impact the first display screen area, and re-blend accordingly. In one embodiment, the re-blending and replacement are advantageously delayed. In another embodiment, the application further intercepts and causes cursor events to be handled properly, based at least in part on a current blending bias between the non-blocking always visible display, and the underlying display windows.

32 Claims, 10 Drawing Sheets

TECHNIQUES FOR DISPLAYING NON-BLOCKING ALWAYS VISIBLE DISPLAYS AND THEIR APPLICATIONS

BACKGROUND OF THE INVENTION

1. Field of the Invention

The present invention relates to the fields of data processing. More specifically, the present invention relates to the provision of graphical user interface.

2. Background Information

Graphical user interface (GUI) is known in the art. In modern computing, it is customary for operating systems that support GUIs to support windowing of displays, to allow concurrent displays of execution results of multiple applications executing at the same time, as long as the corresponding display windows of the applications do not overlap or block each another. Typically, if the display windows overlap, one display window, e.g. the focus window, is considered to be the "top" window, and its contents are made visible. All other contents located in areas of the other display window overlaid by the "top" window are "blocked", and accordingly not visible.

In certain applications, such as annotating a document, it is desirable to simulate the effect of transparency. That is, the contents of the underlying display windows, including e.g. the icons of the desktop are made visible. See e.g. IBM Technical Disclosure Bulletins, April 1988, pp. 268-270, and June 1994, pp. 303-304.

A number of techniques for creating transparent or translucent windows are known in the art. For example, U.S. Pat. No. 4,868,765 disclosed a substantially hardware approach, employing a controller having what is referred to as a "porthole bit save array, where its content may be selectively transferred into a screen memory. Another example is U.S. Pat. No. 5,999,191 a software approach for selectively blending the contents of a number of display windows to achieve the transparency or translucent effect is disclosed. The technique is designed for implementation by an operating system (as applications generally do not have access to the contents of the display windows of other applications).

However, in a number of execution environments, such as the Windows' Operating System of Microsoft Corp, Redmond, Wash., while the operating system supports GUIs and windowing of displays, the operating system does not provide any support for transparent or translucent windows. As a result, the evolution of GUIs to provide ever more satisfying user experience in these environments has been stymied. For example, while the task bar is a very useful feature, in order to minimize its blocking effect on other windows, it typically has to be either hidden or kept to a relatively small size. Obviously, if it is hidden, it has to be re-displayed whenever it is needed, and while it is hidden, the descriptions of the various open windows are not visible. But even if it is displayed, as a result of its typical small size, the descriptions of the various open windows are virtually incomprehensible most of the times. Similarly, if a user desires to monitor the on-line world, e.g. to continually receive stock quotes or news headlines, as increasingly more and more users want to do, again in order minimize its blocking effect on other windows, the monitoring browser window must be kept relatively small and at a corner. Moreover, there is no visible differentiation between the windows displaying results of locally executed applications, and contents streamed from the on-line world. Likewise, while the emergence of an animated assistant improves a user's experience, its presence often blocks access to various contents or function buttons/icons. As a result, a user has to frequently relocate the animated assistant or "close" it. Further, manufacturers and/or content providers would like to be able to persistently display an always visible logo or other identifying marks, if not for the concern of irritating a user because the logo/mark may obstruct the user's view of other contents.

Thus, additional techniques for displaying and applying non-blocking always visible displays (including windows), especially in operating environments where such supports are not provided by the operating system, are desired.

SUMMARY OF THE INVENTION

A non-blocking always visible display application is provided to copy and save first pixel values corresponding to a first display screen area, blend the copied first pixel values with second pixel values corresponding to a non-blocking always visible display to generate third pixel values, and replace the original first pixel values with the third pixel values to effectuate display of the non-blocking always visible display.

In one embodiment, the application further monitors for display operations that impact the first display screen area, and upon detection of such a display operation, replaces the third pixel values with the first pixel values using the saved first pixel values. Thereafter, upon completion of the impacting display operation, the application copies and saves fourth pixel values corresponding to the first display screen area, blends the copied fourth pixel values with the second pixel values to generate fifth pixel values, and replaces the original fourth pixel values with the fifth pixel values to sustain the non-blocking always visible characteristic of the non-blocking always visible display. In one embodiment, the re-blending and replacement is advantageously delayed to improve efficiency of operation.

In another embodiment, the application further intercepts cursor events associated with the first display screen area, and determines whether the cursor events are to be handled or to be handled by another application program associated with an underlying display window, based at least in part on a current blending bias between the non-blocking always visible display and the underlying display windows.

In one embodiment, the non-blocking always visible display is a window. In other embodiments, it is an on-line data monitor, a task bar, an animated assistant or a logo/mark.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as end-user interfaces, buttons, and so forth, commonly employed by those skilled in the art to convey the substance of their work to others skilled in the art. Parts of the description will be presented in terms of operations performed by a computing device, using terms such as monitoring, intercepting, copying, saving, replacing, and so forth. As well understood by those skilled in the art, these quantities and operations take the form of electrical, magnetic, or optical signals capable of being stored, transferred, combined, and otherwise manipulated through mechanical and electrical components of a digital system. The term digital system includes general purpose as well as special purpose computing machines, systems, and the like, that are standalone, adjunct or embedded.

Various operations will be described in turn in a manner that is most helpful in understanding the present invention, however, the order of description should not be construed as to imply that these operations are necessarily order dependent. Furthermore, the phrase "in one embodiment" will be used repeatedly, however the phrase does not necessarily refer to the same embodiment, although it may.

Overview of Applications

Figure 1A:
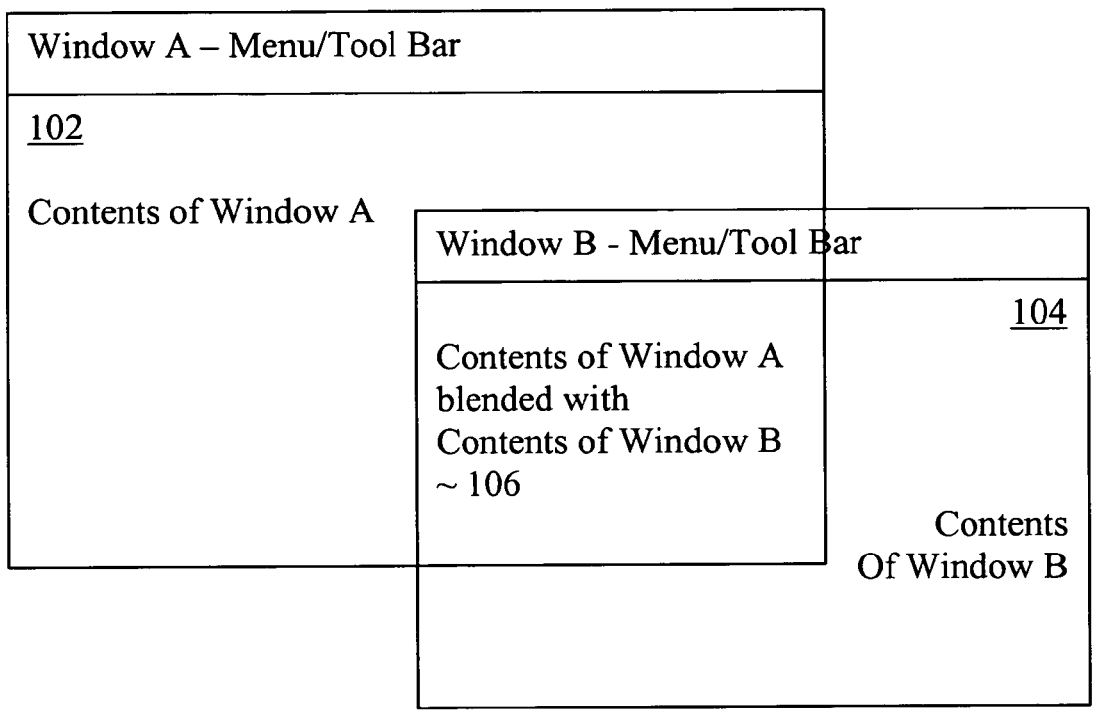
FIGS. 1a-1e illustrate a number of end user interface views of a number of contemplated applications of the present invention, in accordance with a number of embodiments.
Figure 1B:
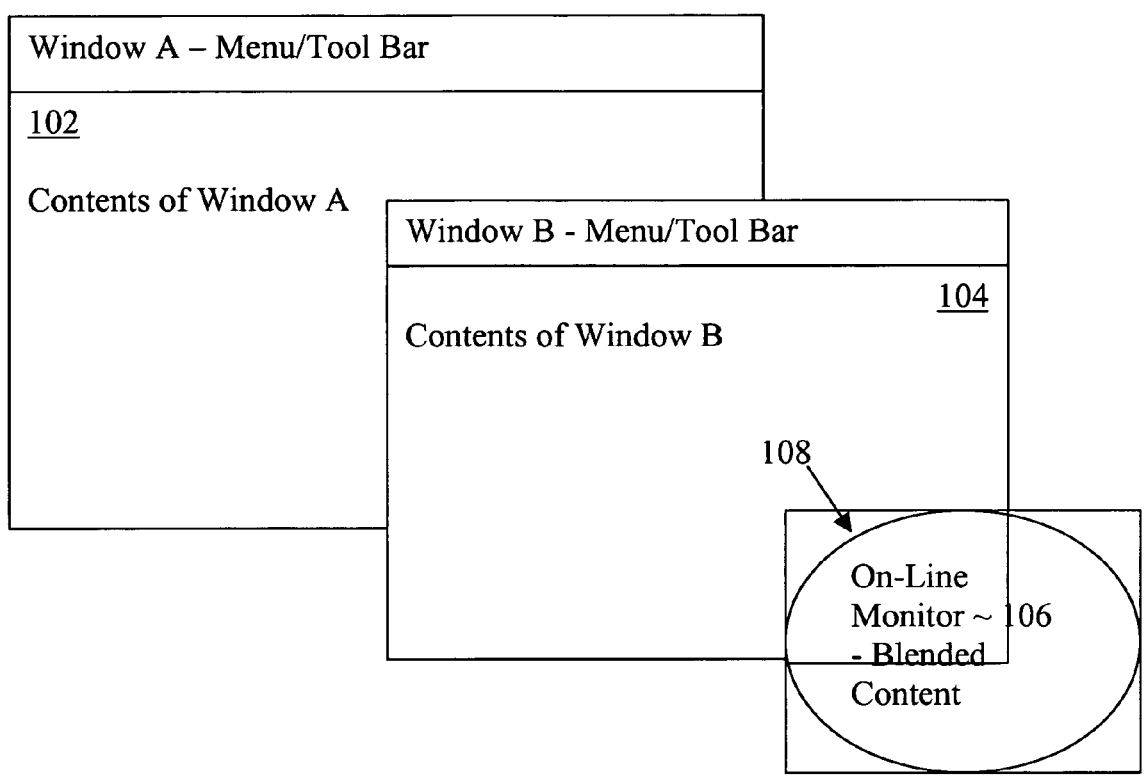
Figure 1C:
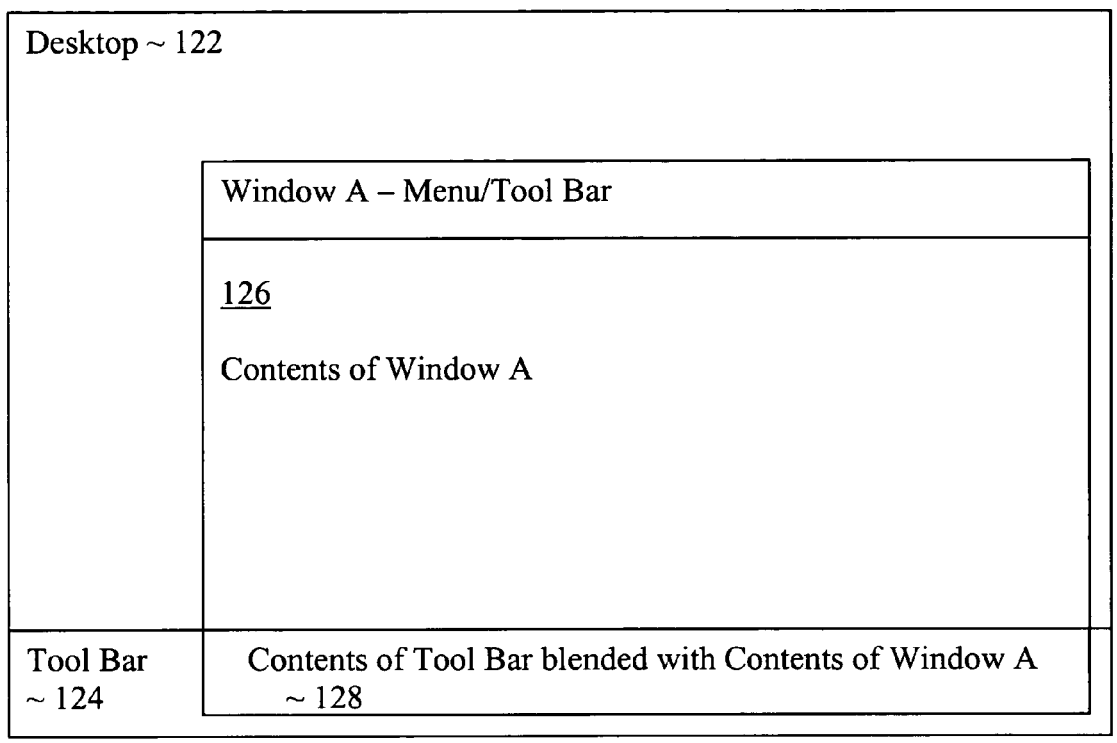
Figure 1D:
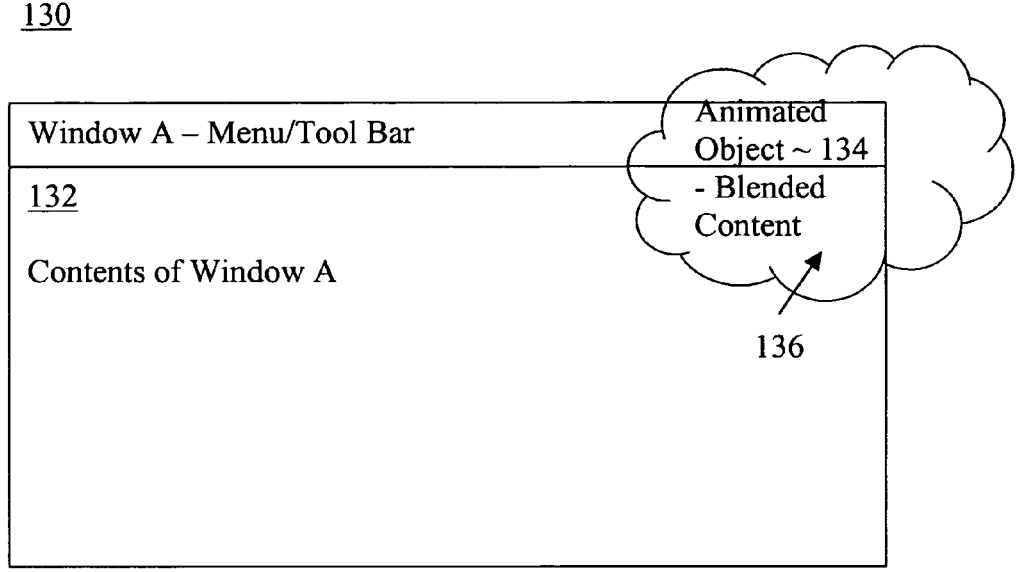
Figure 1E:
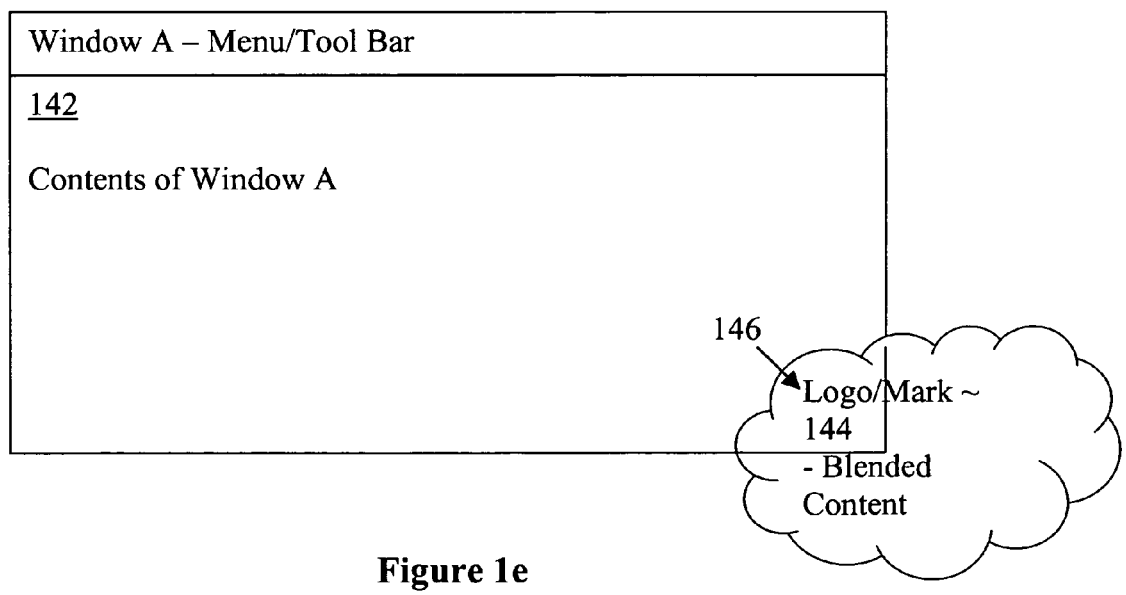

Referring now to FIGS. 1a-1e, wherein five block diagrams illustrating a number of end user views of a number of applications of the present invention, in accordance with one embodiment each, are shown. As illustrated in FIG. 1a, the non-blocking always visible display application of the present invention is designed to be able to generate known non-blocking always visible display window, as exemplified by window 104, where both contents of window 104 as well as contents of window 102 in their intersecting area 106 are visible. However, as will be described in more detail below, the non-blocking always visible display application of the present invention generates the non-blocking always visible display window in the role of an application, without operating system or hardware supports designed to support the generation of transparent/translucent display windows.

As illustrated in FIGS. 1b-1e, the present invention contemplates the extension of the capabilities of the non-blocking always visible display applications into the generation of non-blocking always visible on-line data monitor, such as monitor 106, for monitoring on-line stock data, headlines and the like, non-blocking always visible tool bars, such as tool bar 124, non-blocking always visible animated objects, such as assistant 134, and non-blocking always visible logo/mark, such as mark 146. In each case, "underlying" contents in the intersecting display screen areas, such as areas 108, 128, 136, and 144, are also visible (as well as interactable). As a result of this visibility (and interactability), it is much more acceptable to keep on-line monitor 106, tool bar 124, animated object 134 and logo/mark 144 open, displayed or running.

Component View of Environment

Figure 2:
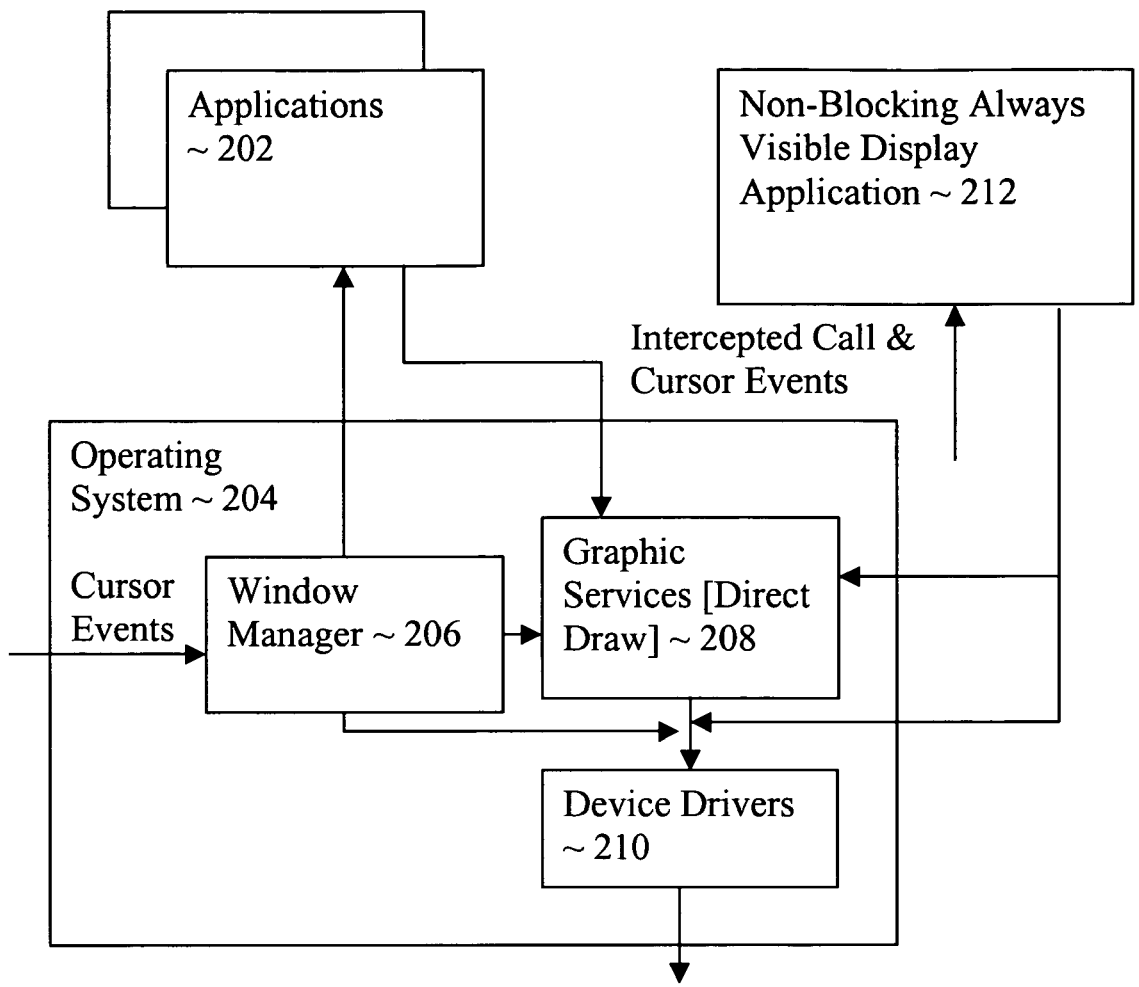
FIG. 2 illustrates a component view of a system, incorporated with the non-blocking always visible display application of the present invention, in accordance with one embodiment.

Referring now to FIG. 2, wherein a block diagram illustrating a component view of a system environment suitable for practicing the present invention, in accordance with one embodiment. As illustrated, system environment 200 include operating system 204 having window manager 206, graphics services 208 and device drivers 210, offering a number of system services in support of applications, such as applications 202. Among the services offered are windowing services offered by window manager 206 to facilitate concurrent display of the execution results of multiple applications 202 executing at the same time. The services also include graphics services offered by graphics services 208 to facilitate graphics rendering by the executing applications. These graphics services include high level graphics calls for rendering complex graphical objects, as well as low level "direct draw" services for rendering low level detail graphical primitives. Device drivers 210 offer various device specific services, including in particular display rendering and associated operations on the pixel value contents of the display screen memory (not shown). Further, operating system 204 includes services for notifying applications 202 of cursor events associated with the display windows of the applications, as well as automatic handling of a number of basic cursor events, e.g. "dragging" or otherwise relocating a display window. However, it is not necessary for operating system 204 to offer any service specifically designed to support the generation and rendering of transparent/translucent displays.

Non-blocking always visible display application 212 operates as an application to operating system 204, just like any other applications 202. If operating system 204 offers re-direction services for re-directing function calls and/or cursor events, non-blocking always visible display application 212 would take advantage of these services, and registers itself for such re-direction. However, such services are optional. If they are not offered, non-blocking always visible display application 212 effectuates the desired re-directs, through one of a number of call/notification interception techniques known in the art, e.g. through modification of the task table of operating system 204.

Overall Operational Flow

Figure 3:
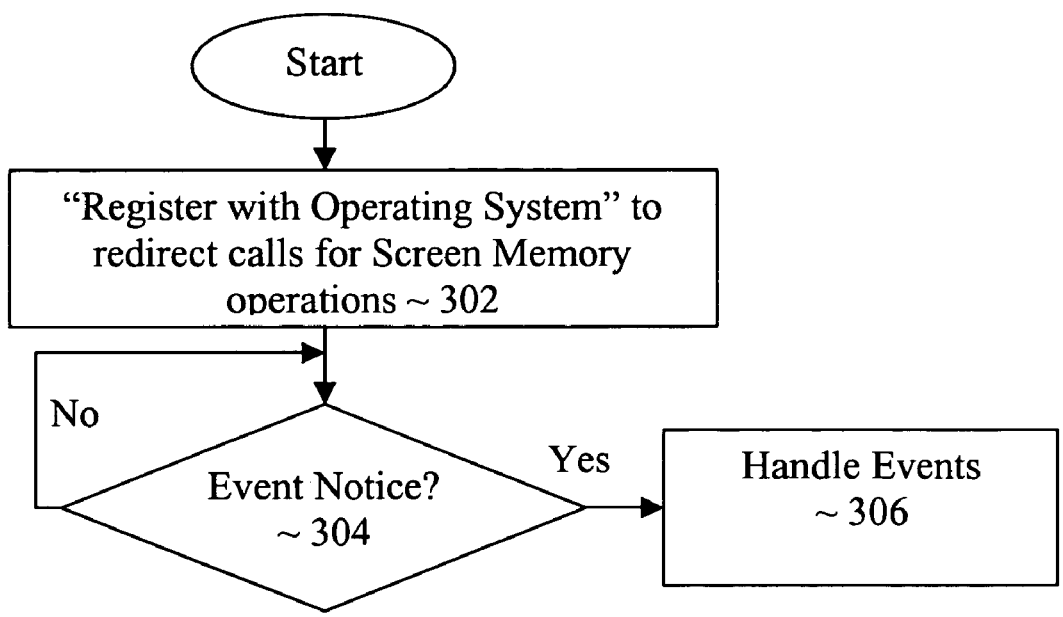
FIGS. 3-7 illustrate the operational flow of the relevant aspects of the non-blocking always visible display application of FIG. 1, including its overall flow, response to a display call, response to a blend sub-function call, response to an intercepted display screen memory operation function call, response to a relevant cursor event, in accordance with one embodiment each.

FIG. 3 illustrates the overall operational flow of the relevant aspects of non-blocking always visible display application 212 of the present invention, in accordance with one embodiment. As illustrated, during initialization or set up time, non-blocking always visible display application 212 would "register" itself (as described earlier) with operating system 204 to redirect all display screen memory operation calls to device driver 210 to itself, block 302. Thereafter, non-blocking always visible display application 212 would await for event notifications (including redirected "calls"), block 304. Upon notified of an event, non-blocking (NB) always visible display application 212 would handle the notification accordingly, block 306. In particular, NB always visible display application 212 would handle certain call and cursor event redirections as set forth below.

Response to Displaying a NB Always Visible Display

Figure 4:
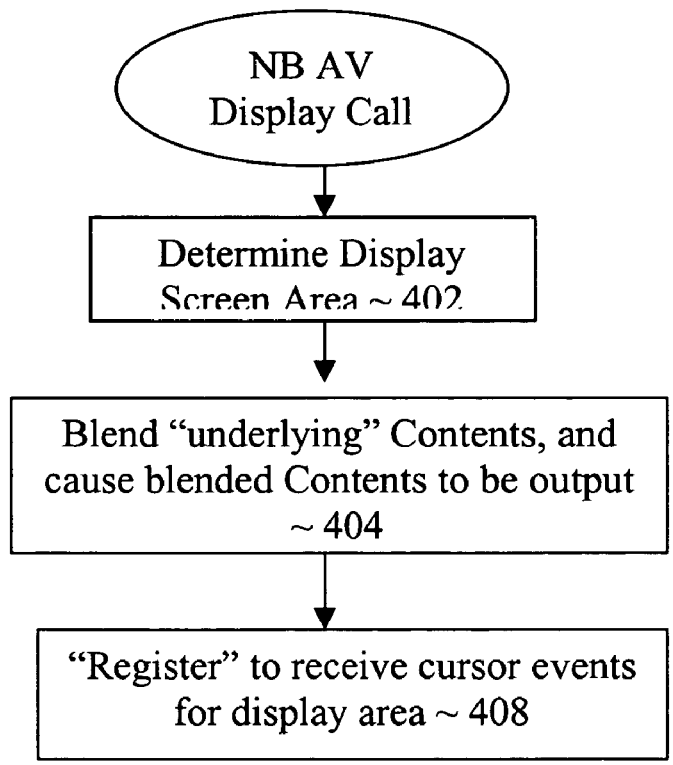

FIG. 4 illustrates the operational flow of the relevant aspects of NB always visible display application 212 of the present invention, when responding to a request to render a NB always visible display, in accordance with one embodiment. As illustrated, in response to a call (e.g. by another application) to render such display, e.g. NB always visible window 104, on-line data monitor 106, tool bar 124, animated assistant 134, and logo/mark 144, NB always visible application 212 determines the physical location of the display screen area, on which the NB always visible display is to be displayed, block 402. The determination is typically made by mapping the logical location information provided with the function call to the actual physical location. Alternatively, such as the contemplated logo/mark application, the location may be defaulted to an initial area.

Upon making the determination, for the illustrated embodiment, NB always visible application 212 invokes a blending sub-function to blend the underlying contents with the content of the NB always visible display, which also causes the blended content to be displayed, thereby effectuating the desired non-blocking (or see through) effect, block 404 (to be described more fully below). Upon causing the blending and output of the blended content (to effectuate the non-blocking or see through effect), NB always visible application 212 "registers" itself to have cursor events associated with the display screen area where the NB always visible display is displayed, redirected to itself for processing, block 408.

Blending, Output of Blended Content, and Availability of Underlying Content

Figure 5:
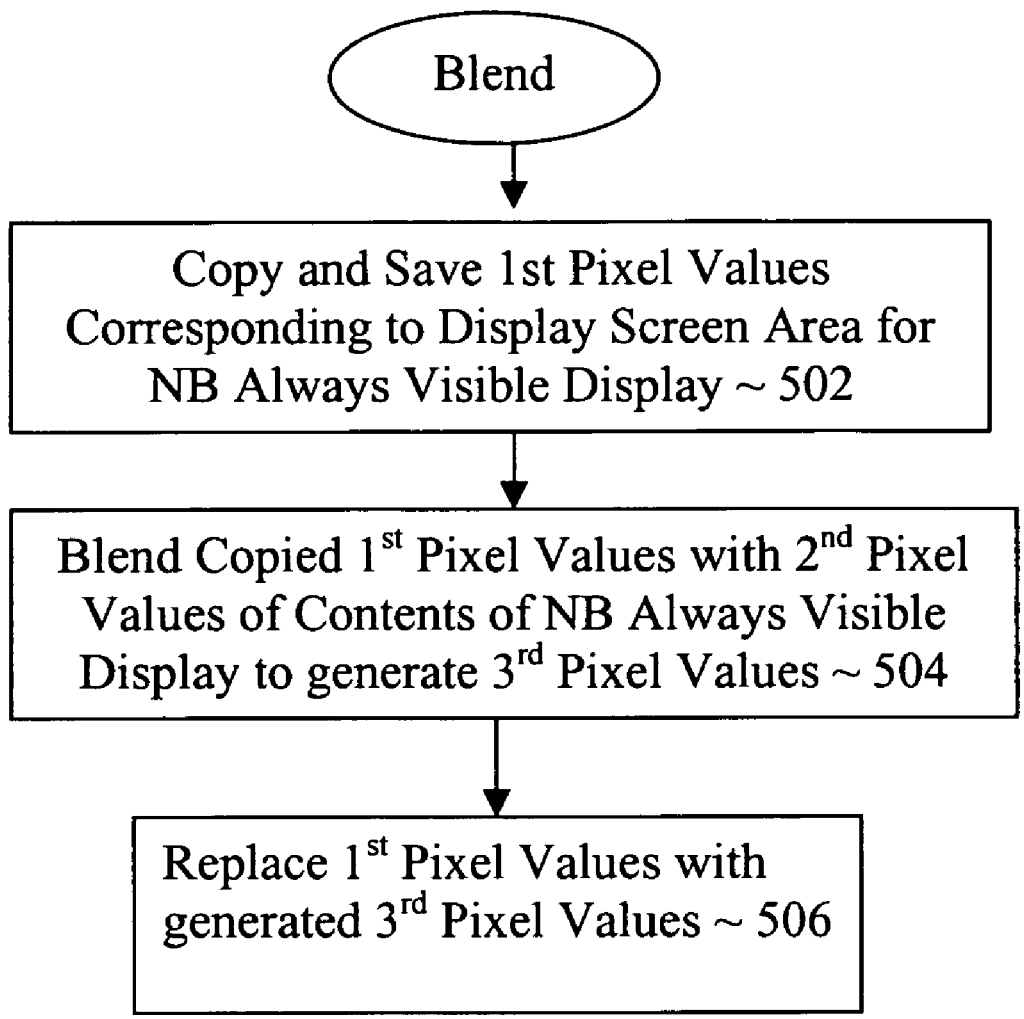

FIG. 5 illustrates the operational flow of the relevant aspects of NB always visible display application 212 of the present invention, when responding to a blending and output of blended content request, in accordance with one embodiment. As illustrated, upon request, NB always visible display application 212 copies and saves the pixel values corresponding to the target display screen area from the display screen memory to a first buffer (not shown), block 502. Thereafter, NB always visible display application 212 blends the copied pixel values with the pixel values of the NB always visible display (stored e.g. in a second buffer (also not shown)), to generate a new set of pixel values representing the blended content, block 504. The blending is performed in accordance with a current blending setting ($\alpha$). That is, the blended content equals $(\alpha \times p1)+((1-\alpha) \times p2)$, where p1 represents the pixel values of the underlying contents, and p2 represents the pixel values of the NB always visible display. The operation is known as alpha-blending, and the technique is known in the art.

Thereafter, NB always visible display application 212 causes the original corresponding pixel values in the display screen memory to be replaced by the newly generated pixel values representing the blended content, block 506. In one embodiment, NB always visible display application 212 stores the pixel values of the blended content in a third buffer (also not shown), and marks the buffer as "dirty" (i.e. its content changed). For this embodiment, NB always visible display application 212 includes a "thread" that periodically checks to determine if the blended content buffer has been marked "dirty". If not, no action is taken. But, if it is, it copies the newly generated pixel values from the blended content buffer into the display screen memory replacing the earlier described original pixel values corresponding to the display screen area where the NB always visible display is to be displayed.

[As those skilled in the art would appreciate, when ($\alpha$=0.5), both the underlying contents as well as the content of the NB always visible display are equally favored. On the other hand, if ($\alpha$<0.5), the underlying content is biased or favored, and if ($\alpha$>0.5), the content of the NB always visible display is biased or favored.]

Operations Impacting Underlying Content

Figure 6:
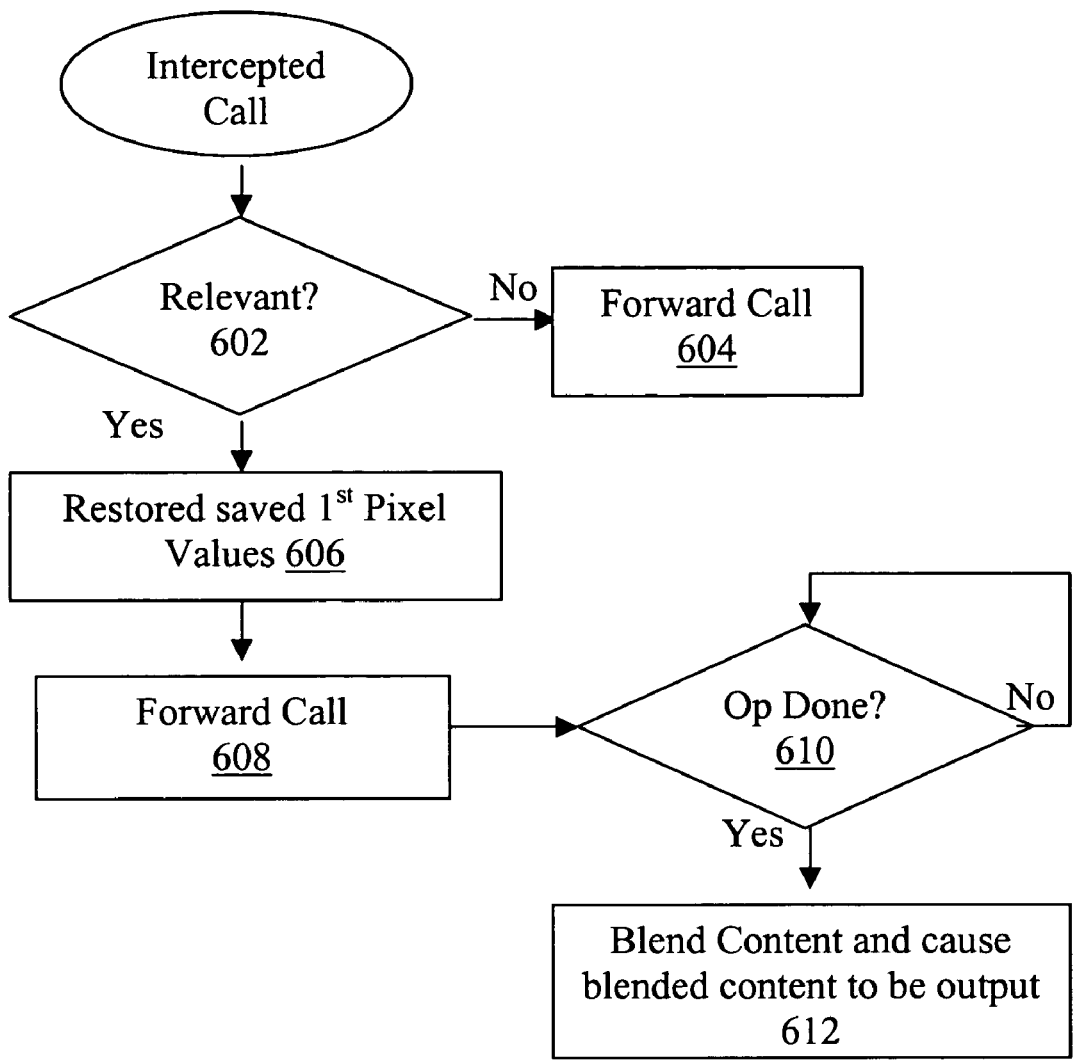

FIG. 6 illustrates the operational flow of the relevant aspects of NB always visible display application 212 of the present invention, on handling graphics services and display screen memory operation calls, in accordance with one embodiment. As illustrated, upon intercepting a display screen memory operation call, NB always visible display application 212 determines if the call is relevant, i.e. whether the operation will impact the display screen area where the NB always visible display is displayed, block 602. NB always visible display application 212 makes the determination by examining the physical location information, and determining if the physical locations intersect with the physical locations of the NB always visible display.

If it is determined that the call is not relevant, i.e. the operation does not impact the display screen area where the NB always visible display is displayed, NB always visible display application 212 forwards the call to its specified recipient, i.e. device drivers 210, for handling, block 604. On the other hand, if it is determined that the call is relevant, i.e. the operation does impact the display screen area where the NB always visible display is displayed, NB always visible display application 212 first restores the saved pixel values for the area, block 606, before forwarding the call to the intended recipient to handle, block 608. Thereafter, NB always visible display application 212 awaits completion of the operation, block 610, which may be accomplished in any one of a number of techniques known in the art. Upon detecting completion of the operation, NB always visible display application 212 invokes the blending sub-function to regenerate the blended content, and causes the newly generated blended content to be output substantially as described earlier, block 612.

In one embodiment, upon copying and saving the pixel values in the display screen buffer corresponding to the display screen area for the NB always visible display (equivalent of operation 502), instead of immediately performing the earlier described blending (operation 504), the blending sub-function merely replaces the copied pixel values in the display screen buffer with the last generated blended values (for efficiency of operation). Thereafter, at a predetermined later point in time, the blending sub-function blends the copied and saved pixel values with the content of the NB always visible display to generate new blended content. Again, in a preferred mode of operation, the buffer containing the re-generated blended content is then marked "dirty", and an asynchronously executing thread is employed to periodically check for the need to re-output the blended content. As those skilled in the art will appreciate, the delayed re-blending and asynchronous output provide a more efficient manner of operation. The amount of delay is application dependent and may be empirically chosen.

Thus, through interception of calls to display screen memory operations by device driver 210, NB always visible display application 212 is nevertheless able to facilitate proper processing of the underlying contents, notwithstanding the absence of specifically designed transparent/translucent display support by the operating system, and application 212 is executing as a non-privileged application.

Handling Cursor Events in the Display Area

Figure 7:
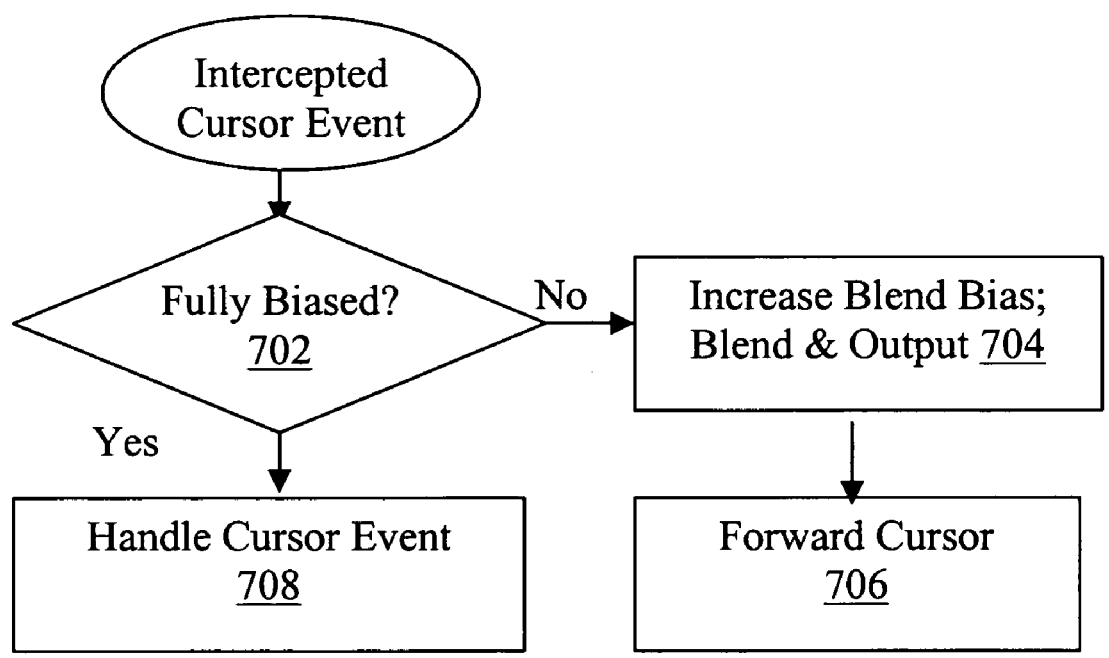

FIG. 7 illustrates the operational flow of the relevant aspects of NB always visible display application 212 of the present invention, for handling cursor events associated with the display area where the NB always visible display is displayed, in accordance with one embodiment. As illustrated, upon intercepting a cursor event notification, NB always visible display application 212 determines if the blended content is fully biased in favor of the NB always visible display, block 702. In one embodiment, NB always visible display application 212 makes the determination by examining the current blending setting, i.e. the value of α, to see if α is substantially equal to 1.

If not, NB always visible display application 212 increases the current blending setting, i.e. the value of α, and invokes the blending sub-function to re-blend the contents and causing the newly generated blended contents to be output, block 704. Upon doing so, NB always visible display application 212 forwards the cursor event to the application associated with the underlying content to handle, block 706.

On the other hand, if back at block 702, it is determined that the blended content is fully biased in favor of the NB always visible display, i.e. α is substantially equal to 1, NB always visible display application 212 would handle the cursor event itself, block 708.

As those skilled in the art would appreciate, the effect of these operations is to cause the NB always visible display to gradually become "hardened" (therefore blocking) if a user moves the cursor into the display area. If the user further clicks on the area before the NB always visible display is fully hardened, by virtue of forwarding the cursor event to an application program associated with an underlying window to handle unless the NB always visible display is "hardened", the user's action is effectively interpreted as wanting to interact with the underlying content. On the other hand, if the user waits for the "hardening" of the display area before clicking on the area, by virtue of handling the cursor event under the circumstances, the user's action is effectively interpreted as wanting to interact with the NB always visible display.

The speed the NB always visible display "hardens" depends on how fast α is incremented towards 1. The pace is application dependent. Further, it is not necessary for α to reach 1 before the NB always visible display is consider "fully" biased or hardened. The level at which NB always visible display is to be deem "fully" biased or hardened is also application dependent.

Accordingly, through interception of cursor event notification, and gradual "hardening" of the NB always visible display, NB always visible display application 212 is also nevertheless able to facilitate proper interaction with the underlying contents or the NB always visible display, notwithstanding the absence of specifically designed transparent/translucent display support by the operating system/hardware, and application 212 is executing as a non-privileged application.

Example Computer System

Figure 8:
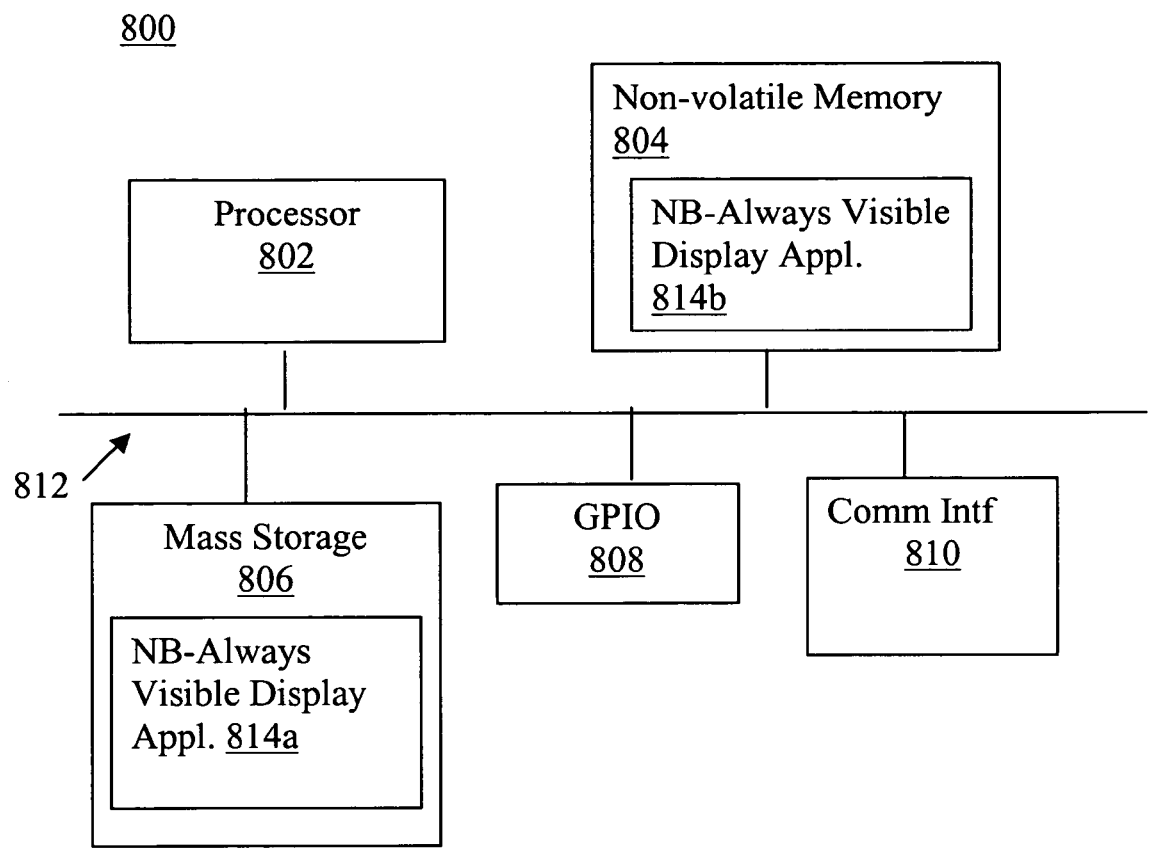
FIG. 8 illustrates an architectural view of an example computer system suitable for practicing the present invention, in accordance with one embodiment.

FIG. 8 illustrates an example computer system suitable for use to practice the present invention, in accordance with one embodiment. As shown, system 800 includes one or more processors 802 and system memory 806. Additionally, system 800 includes mass storage devices 806 (such as diskette, hard drive, CDROM and so forth), GPIO 808 (for interfacing with I/O devices such as keyboard, cursor control and so forth) and communication interfaces 810 (such as network interface cards, modems and so forth). The elements are coupled to each other via system bus 812, which represents one or more buses. In the case of multiple buses, they are bridged by one or more bus bridges (not shown). Each of these elements perform its conventional functions known in the art. In particular, system memory 804 and mass storage 806 are employed to store a working copy 814b and a permanent copy 814a of the programming instructions implementing NB always visible display application 212. Except for its use to host the novel NB always visible display application 212 of the present invention, and practice display of NB always visible displays, such as on-line monitor 106, task bar 124, animated assistant 134 and logo/mark 144. The constitution of these elements 802-814 are known, and accordingly will not be further described.

Accordingly, a set of techniques associated with efficient rendering of non-blocking always visible displays have been described. It can be seen that the techniques may effectuate the desired displays without requiring supports from the operating system or hardware, that are specifically designed for the rendering of transparent/translucent displays. Further, the techniques may be extended to display non-blocking always visible on-line data monitors, task bars, animated assistants, and logos/marks.

While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
    copying and saving first pixel values corresponding to a first display screen area;
    blending the copied first pixel values with second pixel values to generate third pixel values;
    replacing the original first pixel values with the third pixel values to effectuate display of a non-blocking always visible display;
    monitoring for a display operation that impacts the first display screen area, the display operation attempting to alter the first pixel values;
    upon detection of the display operation, replacing said third pixel values with said first pixel values using said saved first pixel values;
    upon completion of the display operation, copying and saving fourth pixel values corresponding to the first display screen area, the fourth pixel values corresponding to the altered first pixel values;
    blending the copied fourth pixel values with said second pixel values to generate fifth pixel values; and
    replacing the original fourth pixel values with the fifth pixel values to sustain the non-blocking always visible characteristic of the non-blocking always visible display.

2. The method of claim 1, wherein the method further comprises
  marking a buffer holding said third/fifth pixel values changed; and
  periodically checking to determine if said buffer has been marked changed.

3. The method of claim 1, wherein said monitoring comprises
  intercepting invocations of display screen memory operations; and
  determining if targeted display screen areas of the display screen memory operations being invoked intersect with said first screen display area.

4. The method of claim 1, wherein the method further comprises
  intercepting cursor events associated with said first display screen area; and determining whether the cursor events are to be handled by an application program associated with said non-blocking always visible display or an application program associated with an underlying display window.

5. The method of claim 4, wherein each of said blending is performed in accordance with a then current blending setting, and said determining comprises determining if the current blending setting is greater than a predetermined threshold, favoring contents of said non-blocking always visible display.

6. The method of claim 1, wherein said non-blocking always visible display is a selected one of an on-line data monitor, a tool bar, a logo/mark, and an animated assistant.

7. A method comprising:
  copying and saving first pixel values corresponding to a first display screen area;
  blending the copied first pixel values with second pixel values corresponding to a non-blocking always visible display to generate third pixel values;
  replacing the original first pixel values with the third pixel values to effectuate display of the non-blocking always visible display;
  intercepting cursor events associated with said first display screen area; and determining whether the cursor events are to be handled by an application program associated with said non-blocking always visible display or an application program associated with an underlying display window, based at least in part on a current blending bias between said non-blocking always visible display and said underlying display windows.

8. The method of claim 7, wherein said blending is performed in accordance with a current blending setting, and said determining comprises determining if the current blending setting is greater than a predetermined threshold, favoring contents of said non-blocking always visible display.

9. The method of claim 7, wherein said non-blocking always visible display is a selected one of an on-line data monitor, a tool bar, a logo/mark, and an animated assistant.

10. A method comprising:
  copying and saving first pixel values corresponding to a first display screen area on which a non-blocking always visible on-line data monitor is to be rendered;
  blending the copied first pixel values with second pixel values corresponding to the non-blocking always visible on-line data monitor to generate third pixel values;
  replacing the original first pixel values with the third pixel values to effectuate display of the on-line data monitor with the non-blocking always visible attribute to provide visual differentiation between said on-line data monitor and underlying display windows associated with locally executed application programs;
  monitoring for a display operations that impacts the first display screen area, the display operation attempting to alter the first pixel values;
  upon detection of the display operation, replacing said third pixel values with said first pixel values using said saved first pixel values;
  upon completion of said display operation, copying and saving fourth pixel values corresponding to the first display screen area, the fourth pixel corresponding to the altered first pixel values;
  blending the copied fourth pixel values with said second pixel values to generate fifth pixel values; and
  replacing the original fourth pixel values with the fifth pixel values to sustain the non-blocking always visible characteristic of the on-line monitor.

11. A method comprising:
  copying and saving first pixel values corresponding to a first display screen area on which a non-blocking always visible task bar is to be rendered;
  blending the copied first pixel values with second pixel values corresponding to the non-blocking always visible task bar to generate third pixel values;
  replacing the original first pixel values with the third pixel values to effectuate display of the task bar with the non-blocking always visible attribute;
  monitoring for a display operations that impacts the first display screen area, the display operation attempting to alter the first pixel values;
  upon detection of the display operation, replacing said third pixel values with said first pixel values using said saved first pixel values;
  upon completion of said display operation, copying and saving fourth pixel values corresponding to the first display screen area, the fourth pixel values corresponding to the altered first pixel values;
  blending the copied fourth pixel values with said second pixel values to generate fifth pixel values; and
  replacing the original fourth pixel values with the fifth pixel values to sustain the non-blocking always visible characteristic of the task bar.

12. The method of claim 11, wherein the method further comprises
  intercepting cursor events associated with said first display screen area; and
  determining whether the cursor events are to be handled by an application program associated with said non-blocking always visible task bar or an application program associated with an underlying display window, based at least in part on a current blending bias between said non-blocking always visible task bar and underlying display windows.

13. A method comprising:
  copying and saving first pixel values corresponding to a first display screen area on which a non-blocking always visible logo/mark is to be rendered;
  blending the copied first pixel values with second pixel values corresponding to the non-blocking always visible logo/mark to generate third pixel values;
  replacing the original first pixel values with the third pixel values to effectuate display of the logo/mark with the non-blocking always visible attribute;
  monitoring for a display operations that impacts the first display screen area, the display operation attempting to alter the first pixel values;

upon detection of the display operation, replacing said third pixel values with said first pixel values using said saved first pixel values;
upon completion of said display operation, copying and saving fourth pixel values corresponding to the first display screen area, the fourth pixel values corresponding to the altered first pixel values;
blending the copied fourth pixel values with said second pixel values to generate fifth pixel values; and
replacing the original fourth pixel values with the fifth pixel values to sustain the non-blocking always visible characteristic of the logo/mark.

14. The method of claim 13, wherein the method further comprises
intercepting cursor events associated with said first display screen area; and determining whether the cursor events are to be handled by an application program associated with said non-blocking always visible logo/mark or an application program associated with an underlying display window, based at least in part on a current blending bias between said non-blocking always visible logo/mark and underlying display windows.

15. A method comprising:
copying and saving first pixel values corresponding to a first display screen area on which a non-blocking always visible animated assistant is to be rendered;
blending the copied first pixel values with second pixel values corresponding to the non-blocking always visible animated assistant to generate third pixel values;
replacing the original first pixel values with the third pixel values to effectuate display of the animated assistant with the non-blocking always visible attribute;
monitoring for a display operations that impacts the first display screen area, the display operation attempting to alter the first pixel values;
upon detection of the display operation, replacing said third pixel values with said first pixel values using said saved first pixel values;
upon completion of said display operation, copying and saving fourth pixel values corresponding to the first display screen area, the fourth pixel values corresponding to the altered first pixel values;
blending the copied fourth pixel values with said second pixel values to generate fifth pixel values; and
replacing the original fourth pixel values with the fifth pixel values to sustain the non-blocking always visible characteristic of the animated assistant.

16. The method of claim 15, wherein the method further comprises
intercepting cursor events associated with said first display screen area; and determining whether the cursor events are to be handled by an application program associated with said non-blocking always visible animated assistant or an application program associated with an underlying display window, based at least in part on a current blending bias between said non-blocking always visible animated assistant and underlying display windows.

17. An apparatus comprising:
storage medium having stored therein programming instructions designed to
copy and save first pixel values corresponding to a first display screen area,
blend the copied first pixel values with second pixel values corresponding to a non-blocking always visible display to generate third pixel values,
replace the original first pixel values with the third pixel values to effectuate display of the non-blocking always visible display,
monitor for a display operations that impacts the first display screen area, the display operation attempting to alter the first pixel values,
upon detection of the display operation, replace said third pixel values with said first pixel values using said saved first pixel values,
copy and save fourth pixel values corresponding to the first display screen area, the fourth pixel values corresponding to the altered first pixel values,
blend the copied fourth pixel values with said second pixel values to generate fifth pixel values,
replace the original fourth pixel values with the fifth pixel values to sustain the non-blocking always visible characteristic of the non-blocking always visible display; and
a processor coupled to the storage medium to execute the programming instruction.

18. The apparatus of claim 17, wherein the programming instructions are further designed to
mark a buffer holding said third/fifth pixel values changed, and
periodically check to determine if said buffer has been marked changed.

19. The apparatus of claim 17, wherein said programming instructions are designed to
intercept invocations of display screen memory operations; and
determine if targeted display screen areas of the display screen memory operations being invoked intersect with said first screen display area.

20. The apparatus of claim 17, wherein the programming instructions are further designed to
intercept cursor events associated with said first display screen area, and determine whether the cursor events are to be handled by an application program associated with said non-blocking always visible display or an application program associated with an underlying display window.

21. The apparatus of claim 20, wherein said programming instructions are designed to perform each of said blending in accordance with a then current blending setting, and perform said determine by determining if the current blending setting is greater than a predetermined threshold, favoring contents of said non-blocking always visible display.

22. The apparatus of claim 17, wherein said non-blocking always visible display is a selected one of an on-line data monitor, a tool bar, a logo/mark, and an animated assistant.

23. An apparatus comprising:
storage medium having stored therein programming instructions designed to
copy and save first pixel values corresponding to a first display screen area,
blend the copied first pixel values with second pixel values corresponding to a non-blocking always visible display to generate third pixel values,
replace the original first pixel values with the third pixel values to effectuate display of the non-blocking always visible display,
intercept cursor events associated with said first display screen area, and
determine whether the cursor events are to be handled by an application program associated with said non-blocking always visible display or an application program associated with an underlying display window, based at least in part on a current blending bias between said non-blocking always visible display and said underlying display windows; and a processor coupled to the storage medium to execute the programming instructions.

24. The apparatus of claim 23 wherein said programming instructions are designed to perform said blend in accordance with a current blending setting, and perform said determine by determining if the current blending setting is greater than a predetermined threshold, favoring contents of said non-blocking always visible display.

25. The apparatus of claim 23, wherein said non-blocking always visible display is a selected one of an on-line data monitor, a tool bar, a logo/mark, and an animated assistant.

26. An apparatus comprising:
storage medium having stored therein programming instructions designed to
copy and save first pixel values corresponding to a first display screen area on which a non-blocking always visible on-line data monitor is to be rendered;
blend the copied first pixel values with second pixel values corresponding to the non-blocking always visible on-line data monitor to generate third pixel values,
replace the original first pixel values with the third pixel values to effectuate display of the on-line data monitor with the non-blocking always visible attribute to provide visual differentiation between said on-line data monitor and underlying display windows associated with locally executed application programs,
monitor for a display operations that impacts the first display screen area, the display operation attempting to alter the first pixel values,
upon detection of the display operation, replace said third pixel values with said first pixel values using said saved first pixel values,
upon completion of said display operation, copy and save fourth pixel values corresponding to the first display screen area, the fourth pixel values corresponding to the altered first pixel values,
blend the copied fourth pixel values with said second pixel values to generate fifth pixel values, and
replace the original fourth pixel values with the fifth pixel values to sustain the non-blocking always visible characteristic of the on-line monitor; and
a processor coupled to the storage medium to execute the programming instructions.

27. An apparatus comprising:
storage medium having stored therein programming instructions designed to
copy and save first pixel values corresponding to a first display screen area on which a non-blocking always visible task bar is to be rendered,
blend the copied first pixel values with second pixel values corresponding to the non-blocking always visible task bar to generate third pixel values,
replace the original first pixel values with the third pixel values to effectuate display of the task bar with the non-blocking always visible attribute
monitor for a display operations that impacts the first display screen area, the display operation attempting to alter the first pixel values,
upon detection of the display operation, replace said third pixel values with said first pixel values using said saved first pixel values,
upon completion of said display operation, copy and save fourth pixel values corresponding to the first display screen area, the fourth pixel values corresponding to the altered first pixel values,
blend the copied fourth pixel values with said second pixel values to generate fifth pixel values, and
replace the original fourth pixel values with the fifth pixel values to sustain the non-blocking always visible characteristic of the task bar; and
a processor coupled to the storage medium to execute the programming instructions.

28. The apparatus of claim 27, wherein the programming instructions are further designed to
intercept cursor events associated with said first display screen area, and determine whether the cursor events are to be handled by an application program associated with said non-blocking always visible task bar or an application program associated with an underlying display window, based at least in part on a current blending bias between said non-blocking always visible task bar and underlying display windows.

29. An apparatus comprising:
storage medium having stored therein programming instructions designed to
copy and save first pixel values corresponding to a first display screen area on which a non-blocking always visible logo/mark is to be rendered,
blend the copied first pixel values with second pixel values corresponding to the non-blocking always visible logo/mark to generate third pixel values,
replace the original first pixel values with the third pixel values to effectuate display of the logo/mark with the non-blocking always visible attribute,
monitor for a display operations that impacts the first display screen area, the display operation attempting to alter the first pixel values,
upon detection of the display operation, replace said third pixel values with said first pixel values using said saved first pixel values,
upon completion of said display operation, copy and save fourth pixel values corresponding to the first display screen area, the fourth pixel values corresponding to the altered first pixel values,
blend the copied fourth pixel values with said second pixel values to generate fifth pixel values, and
replace the original fourth pixel values with the fifth pixel values to sustain the non-blocking always visible characteristic of the logo/mark; and
a processor coupled to the storage medium to execute the programming instructions.

30. The apparatus of claim 29, wherein the programming instructions are further designed to
intercept cursor events associated with said first display screen area; and determine whether the cursor events are to be handled by an application program associated with said non-blocking always visible logo/mark or an application program associated with an underlying display window, based at least in part on a current blending bias between said non-blocking always visible logo/mark and underlying display windows.

31. An apparatus comprising:
storage medium having stored therein programming instructions designed to
copy and save first pixel values corresponding to a first display screen area on which a non-blocking always visible animated assistant is to be rendered, blend the copied first pixel values with second pixel values corresponding to the non-blocking always visible animated assistant to generate third pixel values, replace the original first pixel values with the third pixel values to effectuate display of the animated assistant with the non-blocking always visible attribute monitor for a display operations that impacts the first display screen area, the display operation attempting to alter the pixel values, upon detection of the display operation, replace said third pixel values with said first pixel values using said saved first pixel values, upon completion of said display operation, copy and save fourth pixel values corresponding to the first display screen area, the fourth pixel values corresponding to the alternated first pixel values, blend the copied fourth pixel values with said second pixel values to generate fifth pixel values, and replace the original fourth pixel values with the fifth pixel values to sustain the non-blocking always visible characteristic of the animated assistant; and a processor coupled to the storage medium to execute the programming instructions.

32. The apparatus of claim 31, wherein the programming instructions are further designed to intercept cursor events associated with said first display screen area, and determine whether the cursor events are to be handled by an application program associated with said non-blocking always visible animated assistant or an application program associated with an underlying display window, based at least in part on a current blending bias between said non-blocking always visible animated assistant and underlying display windows.

* * * * *

UNITED STATES PATENT AND TRADEMARK OFFICE
CERTIFICATE OF CORRECTION

PATENT NO.        : 7,342,594 B1
APPLICATION NO. : 09/718868
DATED              : March 11, 2008
INVENTOR(S)       : Ort et al.

It is certified that error appears in the above-identified patent and that said Letters Patent is hereby corrected as shown below:

Column 10
Line 3, "...operations..." should read --...operation...--.

Column 10
Line 11, "...pixel corresponding..." should read --...pixel value corresponding...--.

Column 10
Line 65, "...operations..." should read --...operation...--.

Column 11
Line 34, "...operations..." should read --...operation...--.

Column 12
Line 4, "...operations..." should read --...operation...--.

Column 13
Line 32, "...operations..." should read --...operation...--.

Column 13
Line 62, "...operations..." should read --...operation...--.

Column 14
Line 34, "...operations..." should read --...operation...--.

UNITED STATES PATENT AND TRADEMARK OFFICE
CERTIFICATE OF CORRECTION

PATENT NO.         : 7,342,594 B1
APPLICATION NO.  : 09/718868
DATED              : March 11, 2008
INVENTOR(S)        : Ort et al.

It is certified that error appears in the above-identified patent and that said Letters Patent is hereby corrected as shown below:

Column 15
Line 9, "...operations..." should read --...operation...--.

Column 15
Line 18, "...alternated..." should read --...altered...--.

Signed and Sealed this

Thirty-first Day of March, 2009

JOHN DOLL
*Acting Director of the United States Patent and Trademark Office*